United States Patent [19]

Schuppiser et al.

[11] Patent Number: 4,542,181
[45] Date of Patent: Sep. 17, 1985

[54] LATICES OF VINYL ACETATE POLYMERS

[75] Inventors: Jean-Luc Schuppiser, Claye Souilly; Jean-Claude Daniel, Fontenay-sous-Bois, both of France

[73] Assignee: Rhone-Poulenc Specialties Chimiques, France

[21] Appl. No.: 405,432

[22] Filed: Aug. 5, 1982

[30] Foreign Application Priority Data

Aug. 10, 1981 [FR] France .............................. 81 15438

[51] Int. Cl.$^4$ ............................................ C08F 18/08
[52] U.S. Cl. .................................. 524/560; 524/377; 524/559; 524/563; 524/564; 524/458
[58] Field of Search ............... 524/377, 559, 560, 561, 524/563, 564

[56] References Cited

FOREIGN PATENT DOCUMENTS 1180133 10/1964 Fed. Rep. of Germany .
74536 7/1978 Japan .................................. 524/458
1139202 1/1969 United Kingdom .

*Primary Examiner*—Christopher A. Henderson
*Attorney, Agent, or Firm*—Finnegan, Henderson, Farabow, Garrett & Dunner

[57] ABSTRACT

Latices of vinyl acetate polymers comprising particles having an average diameter between 0.05 and 1 μm and being present in the latex at a concentration of between 10 and 70% by weight. The polymers have a glass transition temperature between −20° and 50° C. The latices also contain a protective colloid comprising a water-soluble polymer (a) containing at least one monomer selected from the group consisting of N-methylolacrylamide and N-methylolmethacrylamide and a water-soluble polymer (b) of ethylene glycol, the polymer (b) having a molecular weight between 1,000 and 50,000.

The latices are prepared by polymerization in aqueous emulsion, in the presence of both an initiator and the above-reference protective colloid. The latices may be applied as binders in the manufacture of paints, glues, paper, textiles, floor coverings and mortar additives.

4 Claims, No Drawings

LATICES OF VINYL ACETATE POLYMERS

The present invention relates to latices of vinyl acetate polymers and to a process for the preparation of the latices.

Latices of vinyl acetate polymers, which are prepared by the polymerization of vinyl acetate, by itself, or mixed with a copolymerizable monomer, in aqueous emulsion, are generally used as binders in the manufacture of glues, paints, textiles, paper, and the like. Such applications require latices which are stable when stored or handled, possess a certain viscosity, and give water-insensitive films.

Unfortunately, the known latices of vinyl acetate polymers do not possess all these properties simultaneously. For example, the latices obtained by polymerization without protective colloids give films having a good water resistance, but possess an undesirably low viscosity.

The presence of carboxyl groups in the polymer improves the viscosity, but the viscosity can still vary with the pH of the latex. Latices obtained by polymerization in the presence of protective colloids, such as cellulose ethers, polyvinyl alcohols, or polyvinylpyrrolidone, possess a satisfactory viscosity irrespective of their pH, but yield very water-sensitive films. Moreover, during preparation, the viscosity of the polymerization medium causes difficulties with agitation, heat exchange, fluid flow and filtration.

The polymer latices that are the subject of this invention do not have these disadvantages. Rather, they simultaneously posses all the properties necessary for desired applications and are easy to prepare.

The latices of vinyl acetate polymers comprise particles of a vinyl acetate polymer, the polymer having a glass transition temperature between $-20°$ and $50°$ C., and the particles having an average diameter between 0.05 and 1 $\mu$m and being present in the latex at a concentration of between 10 and 70% by weight; and a protective colloid comprising a water-soluble polymer (a) containing at least one monomer selected from the group consisting of N-methylolacrylamide and N-methylolmethacrylamide and a water-soluble polymer (b) of ethylene glycol, the polymer (b) having a molecular weight between 1,000 and 50,000.

As will be explained in greater detail hereafter, for a given concentration, the low viscosity of the latices of the invention at acid pH advantageously becomes high at alkaline pH and, once high, the viscosity remains invariable, irrespective of the pH. Further, the latices yield water-insensitive polymer films.

Vinyl acetate polymers are understood to be homopolymers and also copolymers of the vinyl acetate monomer with at least one other copolymerizable monomer selected from amongst the vinyl esters of branched or unbranched, saturated monocarboxylic acids having from 1 to 12 carbon atoms, such as vinyl propionate, "Versatate" (registered trademark for vinyl esters of branched $C_9$-$C_{11}$ acids), vinyl pivalate and vinyl laurate, and/or the alkyl esters of unsaturated monocarboxylic or dicarboxylic acids possessing 3 to 6 carbon atoms, in which the alkyl group possesses 1 to 10 carbon atoms, such as methyl, ethyl, butyl and ethylhexyl acrylates, methacrylates, maleates, and fumarates.

In the latex, the concentration of polymer particles is between 10 and 70%, preferably, between 35 and 65%, by weight. The particles have an average diameter between 0.05 and 1 $\mu$m and the size distribution may be broad or narrow, depending on the polymerization conditions used. The polymers possess a glass transition temperature between $-20°$ and $50°$ C., preferably, between $-10°$ and $35°$ C.

In the latex of vinyl acetate polymer, the protective colloid represent 0.1 to 5%, preferably, 0.5 to 3%, by weight of the polymer and is formed of 15 to 70% by weight of a polymer (a) and 30 to 85% by weight of a polymer (b), of ethylene glycol.

Polymer (a) is understood as meaning homopolymers of N-methylolacrylamide or N-methylolmethacrylamide; or copolymers of N-methylolacrylamide and N-methylolmethacrylamide in any proportions; or copolymers of N-methylolacrylamide and/or N-methylolmethacrylamide with at least one of the following monomers: acrylamide, methacrylamide and the N-alkyl derivatives of acrylamide or methacrylamide in which the alkyl group possesses 1 to 4 carbon atoms and can be substituted by amine groups or alkoxy groups possessing 1 to 4 carbon atoms, or in which the alkyl group possesses 2 to 4 carbon atoms and can be substituted by a hydroxyl group. In these copolymers, the acrylamide or methacrylamide represents at most 90% by weight of the copolymer. Representative examples include acrylamide, methacrylamide, N-methylacrylamide, N,N-dimethylacrylamide, N-isopropylacrylamide, N-methylaminoisopropylacrylamide, N-methoxymethylacrylamide and N-isobutoxymethylacrylamide. Alternatively, mixtures of the above homopolymers and copolymers may be used.

Polymer (b) is understood as meaning: homopolymers of ethylene glycol or copolymers of ethylene glycol and propylene glycol and/or butylene glycol, in which the proportion of ethylene glycol is at least 70% by weight or mixtures of homopolymers or copolymers of different molecular weight; or mixtures of homopolymers and copolymers. These homopolymers and copolymers of ethylene glycol possess a molecular weight between 1,000 and 50,000, preferably, between 3,000 and 35,000.

The latices of the present invention which have an acid pH after their preparation possess a low viscosity, which makes them easier to handle. This viscosity increases as soon as the pH of the latex becomes alkaline, for example through the addition of an alkaline solution, and reaches a maximum, whereupon the viscosity stabilizes and remains invariable, irrespective of the pH.

The maximum viscosity is a function of the nature of the protective colloid and its concentration in the latex. The time taken to reach this maximum viscosity is a function of the value of the alkaline pH, i.e., the closer the pH is to neutrality, the longer the time required to achieve maximum viscosity.

If, for any reason, it is undesirable to reach the maximum viscosity of the latex, it is possible to stop the increase in the viscosity and to stabilize the viscosity by bringing the latex back to acid pH; for example, by adding an acid solution. Making the latex alkaline again causes the increase in the viscosity to resume until the viscosity reaches a value near the maximum.

The process for the preparation of the latices of vinyl acetate polymers comprises the step of polymerizing vinyl acetate, either by itself or mixed with at least one copolymerizable monomer, in aqueous emulsion, in the presence of an initiator and a protective colloid. The protective colloid comprises the water-soluble polymers (a) and (b), described above.

The monomers of the process may be vinyl acetate by itself or vinyl acetate with at least one other copolymerizable monomer, such as the vinyl esters of branched or unbranched, saturated monocarboxylic acids having from 1 to 12 carbon atoms, including vinyl propionate, "Versatate" (registered trademark for vinyl esters or branched $C_9-C_{11}$ acids), vinyl pivalate and vinyl laurate, and/or the alkyl esters of unsaturated monocarboxylic or dicarboxylic acids possessing 3 to 6 carbon atoms, in which the alkyl groups possess 1 to 10 carbon atoms, such as methyl, ethyl, butyl and ethylhexyl acrylates, methacrylates, maleates and fumarates.

The comonomers are used in amounts so that the glass transition temperature of the polymer obtained is between $-20°$ and $50°$ C., preferably, between $-10°$ and $35°$ C.

Depending on the process, the monomer or monomers are introduced into the polymerization medium either in total before polymerization or in successive portions or continuously during polymerization, or in part before polymerization, the other part being introduced in successive portions or continuously during polymerization.

Depending on the polymer desired, a crosslinking monomer and/or a transfer agent may be added to the monomer or the mixture of monomers.

The crosslinking monomer is used in proportions between 0 and 10%, preferably, between 0 and 3%, by weight relative to the monomer(s). Representative crosslinking monomers include vinyl acrylate and methacrylate, divinyl ether, mono- or poly-(alkylene ($C_2-C_4$) glycol) acrylates and methacrylates, allyl phthalate, triallyl cyanurate, tetraallyloxyethane, alkali metal diallylsulfosuccinates, and condensates of unsaturated carboxylic acids ($C_3-C_5$) with polyols, such as, for example, trimethylolpropane acrylate and methacrylate.

The transfer agent, which may be used in proportions between 0 and 10%, preferably, between 0 and 3%, by weight, relative to the monomer(s), is represented, inter alia, by halogenohydrocarbons, such as methylene chloride, chloroform, carbon tetrachloride, bromoform, carbon tetrabromide, dichloroethane and trichloroethane; aliphatic alcohols having 1 to 4 carbon atoms, such as methyl alcohol and allyl alcohol; and, preferably, mercaptans, such as laurylmercaptan, dodecylmercaptan and aminophenylmercaptan.

The crosslinking monomer and/or the transfer agent may be introduced by themselves or in a mixture, before or during polymerization, in any manner which is in itself known, such as at the same time as the monomer or monomers to be polymerized, either simultaneously or, more particularly, in solution in the monomer or the mixture of monomers to be polymerized.

The concentration of monomer(s) in the polymerization medium is advantageously between 10 and 70% by weight.

The initiator may be selected from conventional water-soluble initiators for polymerization in emulsion, such as hydrogen peroxide, alkali metal persulfates, water-soluble diazo derivatives, or redox systems based on oxidizing agents such as hydrogen peroxide, organic peroxides or hydroperoxides, and reducing agents, such as alkali metal sulfites and bisulfites, amines, hydrazine and metal formaldehydesulfoxylates. The initiator is used in proportions of the order of 0.05 to 4.5%, preferably, 0.1 to 2%, by weight of the monomer or monomers, and is introduced into the polymerization medium in total before polymerization or in successive portions or continuously during polymerization, or in part before polymerization, the other part being added in successive portions or continuously during polymerization, especially if the life of the initiator at the polymerization temperature is short.

As mentioned above, the protective colloid to be used in the process comprises two constituents, polymers (a) and (b).

Polymer (a) is understood as meaning: homopolymers of N-methylolacrylamide or N-methylolmethacrylamide; or copolymers of N-methylolacrylamide and N-methylolmethacrylamide in any proportions; or copolymers of N-methylolacrylamide and/or N-methylolmethacrylamide with at least one of the following monomer: acrylamide, methacrylamide and the N-alkyl derivatives of acrylamide or methacrylamide in which the alkyl group possesses 1 to 4 carbon atoms and can be substituted by amine groups or alkoxy groups possessing 1 to 4 carbon atoms, or in which the alkyl group possesses 2 to 4 carbon atoms and can be substituted by a hydroxyl group. In these copolymers, the acrylamide or methacrylamide represents at most 90% by weight of the copolymer. Representative examples include acrylamide, methacrylamide, N-methylacrylamide, N,N-dimethylacrylamide, N-isopropylacrylamide, N-methylaminoisopropylacrylamide, N-methoxymethylacrylamide and N-isobutoxymethylacrylamide. Alternatively, mixtures of the above homopolymers and copolymers may be used.

The homopolymers and copolymers of polymer (a) may be prepared, for example, by polymerizing the amide monomer(s) at a concentration of 0.1 to 7% by weight, in aqueous solution, at a temperature between $0°$ and $90°$ C. in the presence of a water-soluble free-radical initiator and/or ultraviolet rays.

The initiator to be used in the polymerization of polymer (a) may be selected from conventional water-soluble free-radical initiators for polymerization in solution, such as hydrogen peroxide, alkali metal persulfates, water-soluble diazo derivatives or redox systems based on oxidizing agents, such as hydrogen peroxide, organic peroxides or hydroperoxides, and reducing agents, such as alkali metal sulfites and bisulfites, amines, hydrazine, metal formaldehydesulfoxylates and the like. All these initiators are used by themselves or in a mixture, in amounts of 0.1 to 10% by weight of the amide monomer(s).

These homopolymers and copolymers or polymer (a) may be crosslinked by up to 50% by weight of the amide monomer(s), of water-soluble crosslinking agents represented by N,N'-$C_1$-$C_4$-alkylidene-bis-($C_3$-$C_5$-unsaturated acid amides), such as N,N'-methylene-bis-(acrylamide) and N,N'-methylene-bis-(methacrylamide), diallyl ether, diallyl sulfosuccinate and polyallyloxyethane.

As described above, polymer (b) is understood as meaning: homopolymers or ethylene glycol; or copolymers of ethylene glycol and propylene glycol and/or butylene glycol, in which the proportion of ethylene glycol is at least 70% by weight; or mixtures of homopolymers or copolymers of different molecular weight; or, mixtures of homopolymers and copolymers. These homopolymers and copolymers of ethylene glycol possess a molecular weight between 1,000 and 50,000, preferably, between 3,000 and 35,000. All these homopolymers and copolymers are both well-known and commercially available.

In the process for the polymerization of vinyl acetate according to the invention, the protective colloid comprises 15 to 70% by weight of polymer (a) and 30 to 85% by weight of polymer (b). The colloid is used in an amount of 0.1 to 5%, preferably, 0.5 to 3%, by weight of the monomer(s) to be polymerized.

The two constituents of the protective colloid are used in the form of aqueous solutions.

The solution of polymer (a) may be used at any time after its preparation; however, according to a preferred form of the invention, the solution of polymer (a) is used immediately after its preparation.

The solution of polymer (a) and the solution of polymer (b) may be introduced separately into the medium for polymerization in emulsion, polymer (b) may be dissolved in the solution of polymer (a), or polymer (b) may be present in the medium during the preparation of polymer (a). The solutions are introduced either all at once before polymerization, or in successive portions or continuously during polymerization.

In the aqueous solution or solutions to be used, polymer (a) and polymer (b) combined represent from 0.1 to 15% by weight of the water.

To ensure the stability of the medium for the polymerization of the vinyl acetate, and of the latex to be obtained, it may be advantageous to add one or more emulsifiers to the reaction medium. These emulsifiers, which are anionic and/or non-ionic, are readily available, conventional products for polymerization in emulsion.

Representative anionic emulsifiers include salts of fatty acids; alkali metal alkylsulfates, alkylsulfonates, alkylarylsulfonates, alkylsulfosuccinates, and alkylphosphates; sulfonates of alkylphenol polyglycol ethers; salts of alkylsulfopolycarboxylic acid esters; condensation products of fatty acids with oxyalkanesulfonic and aminoalkanesulfonic acids; sulfated derivatives of polyglycol ethers; sulfated fatty acid esters of polyglycols; and sulfated fatty acid alkanolamides.

Representative non-ionic emulsifiers include fatty acid esters of polyalcohols; fatty acid alkanolamides; polyethylene oxides; ethylene oxide/propylene oxide copolymers; oxyethyleneated alcohols and alkylphenols; sulfated oxyethyleneated alcohols and alkylphenols.

The amount of emulsifier to be used should be 0.1 to 3% by weight of the monomer and the introduction of the emulsifier into the reaction medium may be carried out in total before polymerization, in part before polymerization, the complementary part being added to the reaction medium in successive portions or continuously during polymerization, or in total in successive fractions or continuously during polymerization, depending on the average particle diameter of the latex to be obtained. According to a particular embodiment of the invention, the emulsifier is added to the medium for the preparation of the polymer (a), the first constituent of the protective colloid.

Depending on the nature of the monomer or monomers used, and to prevent hydrolysis of the vinyl acetate polymer, it may be advantageous to keep the polymerization medium at a pH between 3 and 7. This may be achieved by adding a pH regulator to the medium. Representative pH regulators include a base like sodium hydroxide or ammonia; and/or a buffer; such as sodium acetate, sodium bicarbonate, or borax. The regulator is added to the medium, by itself or in a mixture, in total or in part before polymerization, the complementary part being added in successive portions or continuously during polymerization, or in total in successive portions or continuously during polymerization. More particularly, the pH regulator is added to the medium for the preparation of polymer (a), the first constituent of the protective colloid.

The polymerization temperature, which is a function of the initiator used and the polymer to be obtained, is generally between 0° and 95° C., preferably, between 20° and 90° C.

According to a variant of the present invention, the process described above is carried out in the presence of a seed polymer to ensure better control over the particle size of the latex to be obtained. This seed polymer may be identical to or different from the polymer to be obtained. The seed polymer is obtained by the polymerization, in aqueous emulsion, of vinyl acetate and/or at least one of the monomers listed above. The latex of seed polymer obtained is added to the polymerization medium at the same time as one of the constituents of the protective colloid, or at the same time as the mixture of these two constituents. The seed polymer may also be prepared in the presence of one or both of the constituents of the protective colloid.

Depending on the intended application of the latex of vinyl acetate polymer, it is possible to add a plasticizer for the said polymer, before, during or after polymerization, in proportions between 0 and 20%, preferably, between 0 and 10%, by weight, relative to the polymer. This plasticizer, which is used by itself or in a mixture, is chosen from amongst the conventional plasticizers and coalescence agents for polyvinyl acetate, such as halogenated or unhalogenated alkyl ($C_4$–$C_6$) phthalates, like dibutyl, diethyl, and trichloroethyl phthalates, ethylene glycol phthalate, adipate and dibenzoate, butylcarbitol acetate, butyl glycolate, glycerol triacetin, dipropyl or diisobutyl succinates, glutarates and adipates, and tricresyl and triphenyl phosphates.

The latices of vinyl acetate polymers are used as binders in the manufacture of paints, glues, paper, textiles, in particular non-woven textiles, floor coverings and mortar additives.

The following examples of embodiments of the invention are given merely by way of illustration and in no way limit the scope of the invention. In these examples, the percentages are by weight;

the viscosity of the latex is measured at 20° C. using a Brookfield RVT viscometer at a speed of 50 rpm;

the particle diameter is measured by electron microscopy;

the glass transition temperature of the polymer (Tg) is measured by differential calorimetric analysis;

the water resistance is determined by placing a drop of demineralized water on a 300 $\mu$m film of polymer obtained by depositing the latex on a transparent glass plate, this being followed by drying for 2 hours at 50° C. and then for 24 hours at ambient temperature. The water resistance is expressed as the time required for the film to become opaque at the location of the drop of water;

the wet abrasion resistance is measured with the aid of a 6-head abrasion tester, under a load of 1,000 g, performing a maximum of 10,000 to-and-from movements (cycles), on a 100 $\mu$m film of paint deposited, by a filmograph, on a rigid polyvinyl chloride plate and dried for one week at ambient temperature. The degree of wear is determined after a given number of cycles.

EXAMPLE 1

Preparation of the Protective Colloid

The following are introduced into a reactor fitted with a condenser, a nitrogen inlet and a stirrer:
1,500 g of deionized water;
7 g of acrylamide;
11 g of a 60% strength aqueous solution of N-methylolacrylamide;
5.5 g of sodium acetate;
68.5 g of a 25% strength aqueous solution of sodium tetradecylsulfonate; and
18 g of polyethylene glycol of molecular weight 10,000.

The air is removed from the reactor by introduction of a stream of nitrogen. The nitrogen stream is maintained, and the mixture is stirred. After dissolution, the solution is heated to 60° C.

As soon as the solution has reached 60° C., a solution of 0.7 g of ammonium persulfate in 50 cm$^3$ of water is introduced, and the solution is kept at 60° C. for 1 hour. The stream of nitrogen is then stopped.

Polymerization

A solution of 2 g of ammonium persulfate in 50 cm$^3$ of water is added to the solution of protective colloid obtained. 1,800 g of vinyl acetate are then introduced continuously at a constant rate over 3 hours.

15 minutes after the first of the vinyl acetate is introduced, the reaction mixture is heated to 80° C. and kept at this temperature, and 2 g of ammonium persulfate in 200 cm$^3$ of water are introduced into the reactor continuously at a constant rate over 2 hours 45 minutes.

Two hours after these reactants have been completely introduced, the reaction mixture is cooled.

A latex of polyvinyl acetate is obtained, which has the following characteristics:
pH: 4.2
viscosity: 350 mPa.s
concentration: 50%
particle diameter: 0.2–0.5 μm
Tg of the polymer: 34° C.
water resistance: 15 minutes By comparison, a polyvinyl acetate prepared by polymerization in emulsion in the presence of an amount of polyvinyl alcohol equal to that of the protective colloid of Example 1 becomes opaque immediately.

The latex obtained is divided into three parts: A, B and C.

The pH of part A of the latex is brought to 8 by adding ammonia. The viscosity of the latex reaches 5,000 mPa.s after 15 hours and stabilizes.

The pH of part B of the latex is brought to 9 by adding ammonia. The viscosity reaches 5,000 mPa.s after 6 hours and stabilizes. The addition of acetic acid to give a pH of 5 does not substantially modify the viscosity, which stabilizes at 4,900 mPa.s.

The pH of part C of the latex is brought to 9 by adding ammonia. The viscosity reaches 3,000 mPa.s after 2 hours. The addition of acetic acid to give a pH of 5 stops the increase in the viscosity and stabilizes it at 2,800 mPa.s. The addition of ammonia until the pH of the latex is 9 allows the viscosity to increase to 4,700 mPa.s over 4 hours and to stabilize.

EXAMPLE 2

The procedure of Example 1 is repeated, with the following modifications:
9 g of polyethylene glycol of molecular weight 10,000 and 9 g of polyethylene glycol of molecular weight 6,000 are used instead of the 18 g of polyethylene glycol of molecular weight 10,000, and
1,494 g of vinyl acetate and 306 g of butyl acrylate are used instead of the 1,800 g of vinyl acetate.

A latex of an 83/17 vinyl acetate/butyl acrylate copolymer is obtained, which has the following characteristics:
pH: 4.2
viscosity: 330 mPa.s
concentration: 50.2%
average particle diameter: 0.2–0.5 μm
Tg of the copolymer: 20° C.

After 6 hours at pH 9, the latex possesses a viscosity of 5,000 mPa.s.

EXAMPLE 3

Preparation of the Protective Colloid

The following are introduced into a reactor fitted with a condenser, a nitrogen inlet and a stirrer:
1,250 g of deionized water;
3.4 g of acrylamide;
21 g of a 48% strength aqueous solution of N-methylolacrylamide;
5.5 g of sodium acetate;
18 g of sodium lauryl-sulfate;
18 g of polyethylene glycol of molecular weight 6,000.

The air in the reactor is removed by introducing a stream of nitrogen. The stream of nitrogen is maintained, and the mixture is stirred. After dissolution, the solution is heated to 60° C.

As soon as the solution has reached 60° C., a solution of 0.7 g of ammonium persulfate in 50 cm$^3$ of water is introduced. The solution is kept at 60° C. for 1 hour. The stream of nitrogen is then stopped.

Polymerization

A solution of 2 g of ammonium persulfate in 50 cm$^3$ of water, and 1.8 g of laurylmercaptan, are added to the solution of protective colloid obtained. A mixture of 1,530 g of vinyl acetate and 270 g of butyl acrylate is then introduced continuously at a constant rate over 3 hours.

15 minutes after the initial introduction of the monomer mixture, the reaction mixture is heated to and maintained at 80° C., and 2 g of ammonium persulfate in 200 cm$^3$ of water are introduced continuously at a constant rate over 2 hours 45 minutes.

Two hours after the reactants have been completely introduced, the reaction mixture is cooled.

A latex of an 85/15 vinyl acetate/butyl acrylate copolymer is obtained, having the following characteristics:
pH: 4.4
viscosity: 620 mPa.s
concentration: 54.9%
particle diameter: 0.2–0.5 μm
Tg of the polymer: 22° C.

The latex is brought to pH 10 by adding sodium hydroxide. After 1 hour, the viscosity reaches 7,000 mPa.s and stabilizes.

EXAMPLE 4

Preparation of the Protective Colloid

The following are introduced into a reactor fitted with a condenser, a nitrogen inlet and a stirrer:
1,100 g of deionized water;
5.5 g of acrylamide;
9.5 g of a 60% strength aqueous solution of N-methylolacrylamide;
4.5 g of sodium acetate;
66 g of a 22.75% strength aqueous solution of sodium tetradecylsulfonate; and
5 g of polyethylene glycol of molecular weight 10,000.

The air is removed by introducing a stream of nitrogen. The latter is maintained and the mixture is stirred. After dissolution, the solution is heated to 60° C.

As soon as the solution has reached 60° C., a solution of 0.7 g of ammonium persulfate in 50 cm³ of water is introduced, and the solution is kept at 60° C. for 1 hour. The stream of nitrogen is then stopped.

Polymerization

A solution of 2 g of ammonium persulfate in 50 cm³ of water is added to the solution of protective colloid obtained. A mixture of 1,125 g of vinyl acetate and 375 g of "Versatate VEOVA 10" (registered trademark) is then introduced continuously at a constant rate over 3 hours.

"Versatate VEOVA 10" is a mixture of vinyl esters of branched $C_9$ to $C_{11}$ monocarboxylic acids.

15 minutes after the start of the introduction of the monomer mixture, the reaction mixture is heated to and maintained at 80° C., and 2 g of ammonium persulfate in 200 cm³ of water are introduced continuously at a constant rate over 2 hours 45 minutes.

Two hours after the reactants have been completely introduced, the reaction mixture is cooled.

A latex of a 75/25 vinyl acetate/"Versatate VEOVA 10" copolymer is obtained, having the following characteristics:
pH: 4.8
viscosity: 540 mPa.s
concentration: 50.9%
average particle diameter: 0.15–0.45 μm
Tg of the copolymer: 20° C.
water resistance: 16 minutes By comparison, a 75/25 vinyl acetate/"Versatate" copolymer prepared in the presence of an amount of polyvinylpyrrolidone equal to that of the protective colloid of Example 4 possesses a water resistance of only 30 seconds.

Application

The latex obtained is used to prepare a paint by adding a pigment paste and ammonia to give a pigment concentration by volume (PCV) of 76% and a pH of 8.5.

The wet abrasion resistance is determined on the paint obtained and, by way of comparison, on a paint having the same PCV but prepared with a latex of a 75/25 vinyl acetate/"Versatate VEOVA 10" copolymer containing an amount of polyvinylpyrrolidone identical to that of the protective colloid of Example 4.

The results, reported in the table below, demonstrate the superior wet abrasion resistance of the paint prepared with the latex of the present invention:

| Degree of Wear | Example 4 | Comparison Experiment |
| --- | --- | --- |
| After 250 cycles | 0% | 40% |
| After 1,000 cyles | 0% | 100% |
| After 10,000 cycles | 0% | 100% |

EXAMPLE 5

Preparation of the Protective Colloid

The following are introduced into a reactor fitted with a condenser, a nitrogen inlet and a stirrer:
1,475 g of deionized water;
30 g of a 60% strength aqueous solution of N-methylolacrylamide;
5.5 g of sodium acetate;
60 g of a 30% strength aqueous solution of sodium tetradecylsulfonate;
36 g of polyethylene glycol of molecular weight 10,000.

The air in the reactor is removed by introducing a stream of nitrogen. The stream of nitrogen is maintained and the mixture is stirred. After dissolution, the solution is heated to 60° C.

As soon as the solution has reached 60° C., a solution of 0.7 g of ammonium persulfate in 50 cm³ of water is introduced. The solution is maintained at 60° C. for 1 hour. The stream of nitrogen is then stopped.

Polymerization

A solution of 2 g of ammonium persulfate in 50 cm³ of water is added to the solution of colloid obtained. A mixture of 1,350 g of vinyl acetate and 450 g of "Versatate VEOVA 10" is then introduced at a constant rate over 3 hours.

15 minutes after beginning the introduction of the monomer mixture, the reaction mixture is heated to and maintained at 80° C., and 2.5 g of ammonium persulfate in 200 cm³ of water are introduced continuously at a constant rate over 2 hours 45 minutes.

Two hours after all the reactants have been completely introduced, the reaction mixture is cooled.

A latex of a 75/25 vinyl acetate/"Versatate" copolymer is obtained, having the following characteristics:
pH: 4.4
viscosity: 368 mPa.s
concentration: 51.4%
particle diameter: 0.15–0.45 μm
Tg of the copolymer 21° C.

The latex is brought to pH 9 by adding ammonia. The viscosity of the latex reaches 14,000 mPa.s after 4 hours and stabilizes.

EXAMPLE 6

Preparation of the Colloid

The following are introduced into a reactor fitted with a condenser, a nitrogen inlet and a sitrrer:
2,580 g of deionized water;
33.75 g of acrylamide;
56.25 g of a 60% strength aqueous solution of N-methylolacrylamide;
27 g of sodium acetate;
75 g of a 30% strength solution of sodium tetradecylsulfonate; and
90 g of polyethylene glycol of molecular weight 10,000.

The air in the reactor is removed by introducing a stream of nitrogen that is maintained during the preparation of the colloid. The mixture is stirred.

After dissolution, the solution is heated to and maintained at 60° C.

As soon as the solution has reached 60° C., 3.5 g of ammonium persulfate in 100 cm$^3$ of water are introduced.

After a reaction time of 1 hour, the passage of nitrogen is stopped.

Preparation of a Seed 4 g of ammonium persulfate and 225 g of ethyl acrylate are added to the colloid solution.

After 20 minutes, the reaction mixture is heated to 80° C., maintained at this temperature for 1 hour and then cooled to ambient temperature.

Polymerization

The following are introduced successively into a reactor:
650 g of the seed obtained above;
980 g of deionized water; and
7 g of laurylmercaptan.

The mixture is stirred and heated to and maintained at 80° C. throughout the reaction.

As soon as the mixture has reached 80° C., a solution of 2 g of ammonium persulfate in 10 cm$^3$ of water is added thereto. A mixture containing 1,251 g of vinyl acetate and 450 g of "Versatate VEOVA 10", and a solution containing 100 g of deionized water, 2 g of ammonium persulfate and 82.5 g of a 22% strength aqueous solution of polyoxyethyleneated nonylphenol (30 units of ethylene oxide), are then introduced simultaneously at a constant rate over 3 hours.

2 hours after the reactants have been completely added, the reaction mixture is cooled.

A latex of a 72.5/25/2.5 vinyl acetate/Versatate/ethyl acrylate terpolymer is obtained, having the following characteristic
pH: 3.5
viscosity: 2,100 mPa.s
concentration: 51.6%
particle diameter: 0.25-0.55 $\mu$m
Tg of the terpolymer: 20° C.

The pH of the latex is brought to 9 by adding ammonia. The viscosity of the latex reaches 7,500 mPa.s after 4 hours and stabilizes.

What is claimed is:

1. A latex of vinyl acetate polymer comprising:
particles of a vinyl acetate polymer, said polymer being selected from the group consisting of at least one homopolymer of vinyl acetate and at least one copolymer of vinyl acetate with at least one other copolymerizable monomer selected from the group consisting of vinyl esters of branched or unbranched, saturated monocarboxylic acids ($C_1$-$C_{12}$), and alkyl ($C_1$-$C_{10}$) esters of unsaturated monocarboxylic or dicarboxylic acids ($C_3$-$C_6$), said polymer having a glass transition temperature between $-20°$ and $50°$ C., and said particles having an average diameter between 0.05 and 1 $\mu$m and being present in said latex at a concentration of between 10 and 70% by weight; and a protective colloid consisting essentially of:
a water-soluble polymer (a) containing at least one monomer selected from the group consisting of N-methylolacrylamide and N-methylolmethacrylamide and
a water-soluble polymer (b) of ethylene glycol, said polymer (b) having a molecular weight between 1,000 and 50,000, said latex having a first viscosity at acid pH, said first viscosity being lower than a second viscosity obtained when the pH of said latex is made alkaline and wherein said second viscosity remains invariable irrespective of subsequent change in the pH of the latex.

2. The latex of claim 1, wherein the polymer (a) is selected from the group consisting of (a) at least one homopolymer containing a monomer selected from the group consisting of N-methylolacrylamide and N-methylolmethacrylamide; (b) at least one copolymer containing N-methylolacrylamide and N-methylolmethacrylamide monomers, (c) at least one copolymer containing at least one monomer selected from the group consisting of N-methylolacrylamide and N-methylolmethacrylamide and further containing at least one monomer selected from the group consisting of acrylamide, methacrylamide, N-alkyl ($C_1$-$C_4$) derivatives of either acrylamide or methacrylamide which are unsubstituted or substituted by amine or alkoxy ($C_1$-$C_4$) groups, and N-alkyl ($C_2$-$C_4$) derivatives of either acrylamide or methacrylamide which are substituted by a hydroxyl group, and (d) a mixture thereof.

3. The latex of claim 1, wherein the polymer (b) of ethylene glycol is selected from the group consisting of (a) at least one homopolymer of ethylene glycol, (b) at least one copolymer of ethylene glycol and at least one monomer selected from the group consisting of propylene glycol and butylene glycol, wherein the proportion of ethylene glycol is more than 70% by weight and (c) a mixture thereof.

4. The latex of claim 1, wherein said protective colloid is present in an amount of 0.1 to 5% by weight, relative to the polymer, and further wherein said protective colloid is formed of 15 to 70% by weight of said polymer (a) and 30 to 85% by weight of said polymer (b) of ethylene glycol.

* * * * *